(12) United States Patent
Vanderable

(10) Patent No.: US 6,204,761 B1
(45) Date of Patent: Mar. 20, 2001

(54) WEATHER ALERT SYSTEM

(76) Inventor: Jerome Vanderable, 2722 Horseshoe Creek Dr., Marietta, GA (US) 30064

(*) Notice: Subject to any disclaimer, the term of this patent is extended or adjusted under 35 U.S.C. 154(b) by 0 days.

(21) Appl. No.: 09/192,620

(22) Filed: Nov. 13, 1998

(51) Int. Cl.[7] .............................. G08B 1/08; H04N 7/10
(52) U.S. Cl. .......................... 340/539; 340/601; 342/26; 702/3; 455/227; 455/228; 348/9
(58) Field of Search ...................... 340/539, 601; 702/3; 455/227, 228; 342/26; 348/9, 734

(56) References Cited

U.S. PATENT DOCUMENTS

| | | | |
|---|---|---|---|
| 3,603,951 | * 9/1971 | Bracken | 340/539 |
| 3,921,074 | 11/1975 | Baird | 325/303 |
| 4,079,317 | * 3/1978 | Baird | 455/228 |
| 4,158,148 | 6/1979 | Teller, Jr. | 307/233 R |
| 4,348,693 | 9/1982 | Cauldwell | 358/140 |
| 4,392,248 | 7/1983 | Eckels et al. | 455/161 |
| 4,633,515 | 12/1986 | Uber et al. | 455/166 |
| 5,117,359 | * 5/1992 | Eccles | 342/26 |
| 5,121,430 | * 6/1992 | Ganzer et al. | 455/33.1 |
| 5,144,440 | 9/1992 | Wignot et al. | 358/188 |
| 5,148,280 | 9/1992 | Wignot et al. | 358/191.1 |
| 5,276,909 | 1/1994 | Milner et al. | 455/38.5 |
| 5,278,539 | * 1/1994 | Lauterbach et al. | 340/539 |
| 5,444,433 | * 8/1995 | Gropper | 340/601 |
| 5,469,169 | 11/1995 | Frush | 342/26 |
| 5,574,999 | 11/1996 | Gropper | 455/186.1 |
| 5,749,050 | * 5/1998 | Kim | 455/228 |
| 5,940,776 | * 8/1999 | Baron et al. | 702/4 |
| 5,949,851 | * 9/1999 | Mahaffey | 340/601 |
| 5,978,738 | * 11/1999 | Brown | 702/3 |
| 6,031,579 | * 2/2000 | Stephenson | 340/539 |

\* cited by examiner

*Primary Examiner*—Donnie L. Crosland
(74) *Attorney, Agent, or Firm*—Troutman Sanders LLP; Kenneth Southall

(57) ABSTRACT

A weather alert system to warn a user when an emergency signal has been broadcast and to simultaneously activate a television or other visual information source and to select a predetermined informational channel. The weather alert system includes a signal detector for detecting a broadcast alarm signal and for generating an activation signal upon detection of the alarm signal. A remote controller is operatively connected to the signal detector for producing a remote control signal in response to said activation signal. The remote control signal is utilized to trigger the activation of a visual information source such as a television or a computer to provide visual information relating to the hazardous condition.

20 Claims, 5 Drawing Sheets

WEATHER ALERT SYSTEM

BACKGROUND OF THE INVENTION

1. Technical Field

This invention relates generally to a weather alert system and, in particular, this invention relates to a weather alert system which may be mounted to a wall or ceiling in a manner similar to that of a standard smoke detector and which will remotely activate a nearby television or other visual information source in response to an emergency broadcast signal for proving information concerning the emergency to the user.

2. Description of the Prior Art

Modern advances in meteorology and weather detection devices, such as Doppler radar and high resolution weather satellites, have drastically increased the accuracy and timeliness with which severe storms and tornadoes may be predicted or detected. Early issuance of severe weather and tornado warnings by the National Weather Service (NWS) and National Oceanographic and Atmospheric Administration (NOAA) has saved many lives by allowing those living in affected areas to seek shelter before arrival of the severe weather conditions. However, for these warnings to be effective, they must be received and communicated to their intended recipients.

Warning of severe weather is usually provided through the NOAA Weather Radio system. NOAA Weather Radio is a 24-hour, nationwide network of radio stations broadcasting continuous weather information directly from local National Weather Service offices. NOAA Weather Radio broadcasts alerts for the Emergency Alert system maintained by the Federal Communication Commission to provide emergency warnings for all types of hazards, including such things as earthquakes, volcanoes, severe weather and nuclear war. The NOAA Weather Radio system has more than 450 transmitters, covering the 50 states, adjacent coastal waters, Puerto Rico, the U.S. Virgin Islands, and the U.S. Pacific Territories. NOAA Weather Radio generally requires a special radio receiver or scanner capable of picking up its emergency warning signal.

Tone activated alert receivers are now commonly used to monitor NOAA Weather Radio broadcasts, to provide warning of severe weather and to provide emergency and civil defense alerts. A tone alert receiver works by constantly monitoring the local NOAA Weather Radio broadcasts for a specific 1050 Hz alert tone. Upon receipt of the alert tone, the tone alert receiver activates an audio and/or visual alarm, followed by activation of a radio tuned to the NOAA Weather Radio broadcast. However, tone alert receivers are only effective if they are plugged in and set-up correctly to monitor the appropriate frequency. Often, after several false alerts, an individual will become frustrated and unplug the radio, thereby losing its benefits. Additionally, battery powered tone alert receivers are susceptible to battery depletion and failure and may be rendered incapable of providing necessary warnings.

Newer NOAA Weather Radio receivers incorporate a feature known as Specific Area Message Encoding (SAME) to improve the specificity of weather alerts and to decrease the frequency of false alerts. SAME receivers are programmed to recognize a specific digital code designating a specific locality for which alerts are desired. Once programmed, a SAME receiver will only switch into alarm mode upon receipt of an emergency broadcast signal including a SAME digital location code matching the preprogrammed digital code.

In the modern era of expanding weather coverage by specialized carriers of information such as The Weather Channel®, additional information is now available beyond that typically included in the NOAA radio broadcasts. For example, many local cable companies provide a channel displaying continuous weather radar for their locality. Therefore, once alerted to a weather emergency, individuals may now observe approaching severe weather systems on a more local basis and adjust their preparations accordingly. Accordingly, there is a need for a weather alert system which also provides for access to such sources of visual emergency information.

It is therefore an object of the present invention to provide a weather alert system which activates a nearby visual information source and selects a useful informational channel in response to a broadcast signal indicative of a hazardous condition.

It is another object of the present invention to provide a weather alert system which can remotely activate visual information sources of a variety of different models manufactured by a number of manufactures.

It is another object of the present invention to provide a weather alert system which may be mounted in a home or office in a manner similar to that of a conventional smoke detector thereby decreasing the likelihood of deactivation by the user.

It is yet another object of the present invention to provide a weather alert system which may be hardwired into a home or office, thereby reducing the chance of failure due to battery failure.

It is yet another object of the present invention to provide a weather alert system having a battery backup power system, thereby reducing the chance of failure due to power outage.

It is another object of the present invention to provide a weather alert system which will provide audio and visual alarms in response to a broadcast signal indicative of a hazardous condition.

It is another object of the present invention to provide a weather warning system having an emergency lighting fixture for providing light upon failure of an external power source.

SUMMARY OF THE INVENTION

The above objectives and others which will become clear in the following specification are accomplished according to the present invention by providing a weather alert system which warns the user when an emergency alert signal has been broadcast and simultaneously activates a television or other visual information source to a desired informational channel.

The weather alert system includes a signal detector for detecting a broadcast alarm signal and for generating an activation signal upon detection of the alarm signal. A remote controller is operatively connected to the signal detector for producing a remote control signal in response to said activation signal. The remote control signal is utilized to trigger the activation of a visual information source such as a television or a computer to provide visual information relating to the hazardous condition.

BRIEF DESCRIPTION OF THE DRAWINGS

The device designed to carry out the invention will hereinafter be described, together with the salient features thereof. The invention will be more readily understood from a reading of the following specification and by reference to the accompanying drawings forming a part thereof, wherein an example of the invention is shown.

DETAILED DESCRIPTION OF PREFERRED EMBODIMENT

Figure 1:
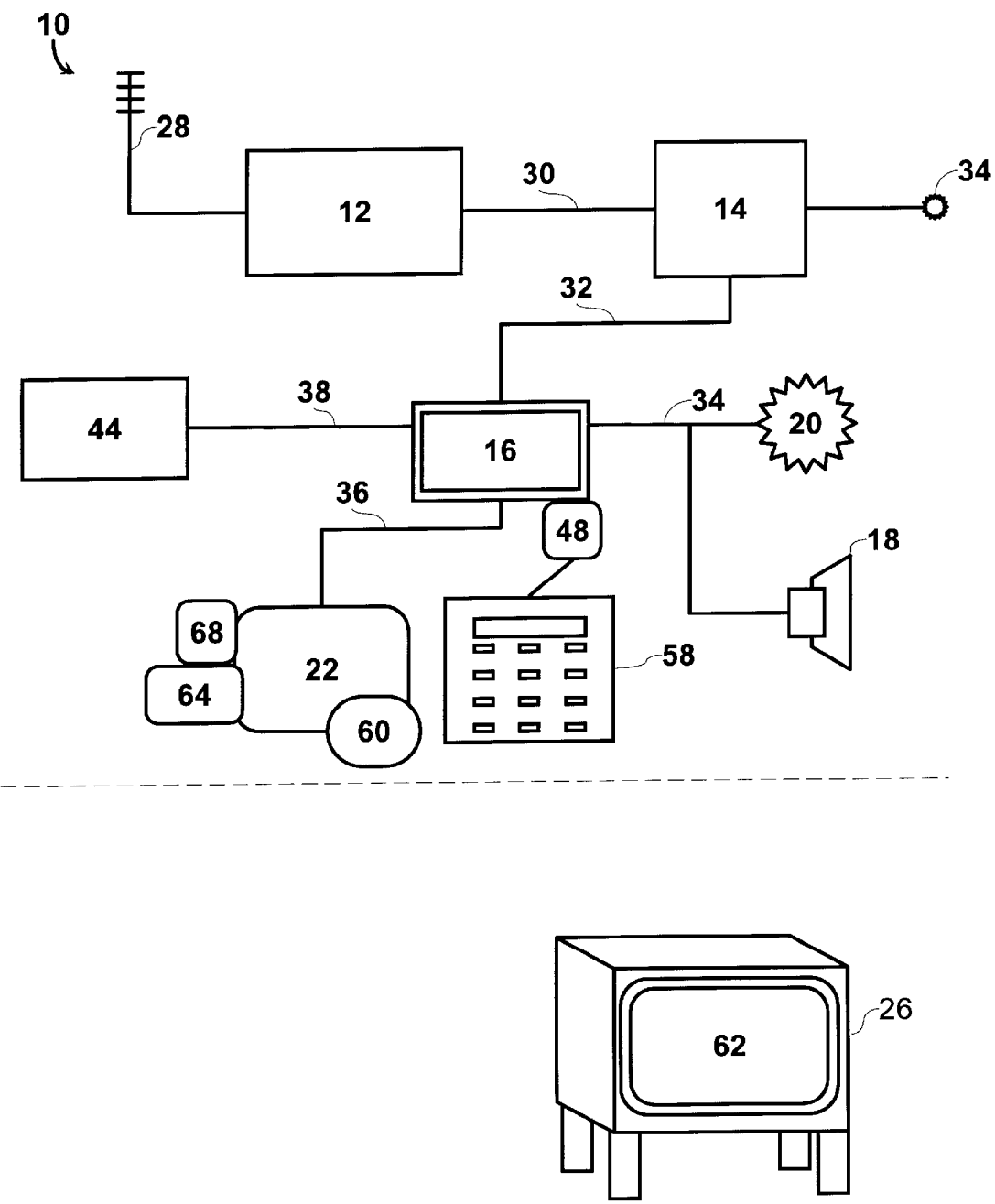
FIG. 1 is block diagram illustrating an exemplary embodiment of the weather alert system in accordance with the present invention.

Referring now in more detail to the drawings, the invention will now be described in more detail. FIG. 1 illustrates a block diagram of a weather alert system 10 in accordance with an exemplary embodiment of the present invention. The weather alert system 10 includes a receiver 12 for receiving signals indicative of a hazardous condition, a signal detector 14 for detecting the signals indicative of a hazardous condition, a microprocessor 16 for generating internal control signals, an audible alarm 18 and a visual strobe alarm 20 which are responsive to an alarm activation internal control signal for alerting a user of the hazardous condition, and a remote controller 22 for activating an visual information source 26 such as a television to a preselected informational channel.

Receiver 12 includes a standard crystal based radio frequency receiver which can be tuned to any of seven commonly used National Weather Service broadcast frequencies which are clustered in the range of about 162.4 MHz to 162.55 MHz. In the exemplary embodiment, receiver 12 may be set to monitor the particular local National Weather Service broadcast frequency. In an alternate embodiment, receiver 12 constantly scans the spectrum of available National Weather Service broadcast frequencies. In yet another embodiment, receiver 12 will scan the National Weather Service broadcast frequencies when initially activated and will lock onto the strongest signal for monitoring thereafter as the local signal.

Receiver 12 converts received RF signals to an analog signal representative of the received signal for output to signal detector 14 via receiver output line 30. One of ordinary skill in the art will recognize that, in an alternate embodiment, receiver 12 may also output a digital signal representative of the received signal to signal processor 14. Also, in yet another embodiment shown in FIG. 2, receiver 12 may instead include an interface 40 adapted to receive a signal from a hardwired digital or analog communications network 24 such as a telephone network, a computer wide-area network or a direct Internet connection.

In the exemplary embodiment of FIG. 1, signal detector 14 receives the representative signal output by receiver 12 and constantly monitors it to determine whether an emergency alert alarm signal indicating a hazardous condition (typically 1050 Hz) has been broadcast for a period of time greater than a selected minimum duration (typically ~1 second). Upon detection of an emergency alert alarm signal of greater than the selected minimum duration, signal detector 14 outputs a digital alert internal control signal to microprocessor 16 via detector output line 32. Signal detector 14 also activates a status LED 34 to indicate to the user when an appropriate NOAA Weather Radio broadcast has been locked in and is being monitored. In the event of a loss of the broadcast signal, status LED 34 will flash to attract the user's attention.

In the exemplary embodiment, signal detector 14 also monitors the representative signal output by receiver 12 to detect a portion of the emergency alert signal encoding a location in accordance with the Specific Area Message Encoding (SAME) format. Upon receipt of an emergency alert signal including an encoded SAME location, signal detector 12 will also output a digital signal representative of the SAME encoded location to microprocessor 16 via detector output line 32.

As shown in FIG. 1, microprocessor 16 receives digital alert internal control signals and signals representative of a coded SAME location from signal detector 14. In the exemplary embodiment, the user may enter a location identifying code via a keypad 58 for storage in an internal memory storage unit 48. The location identifying code corresponds to the geographic location of the building or structure in which the alert system is located, as determined from a list of applicable codes provided by NOAA corresponding to locations under the SAME format.

Figure 3:
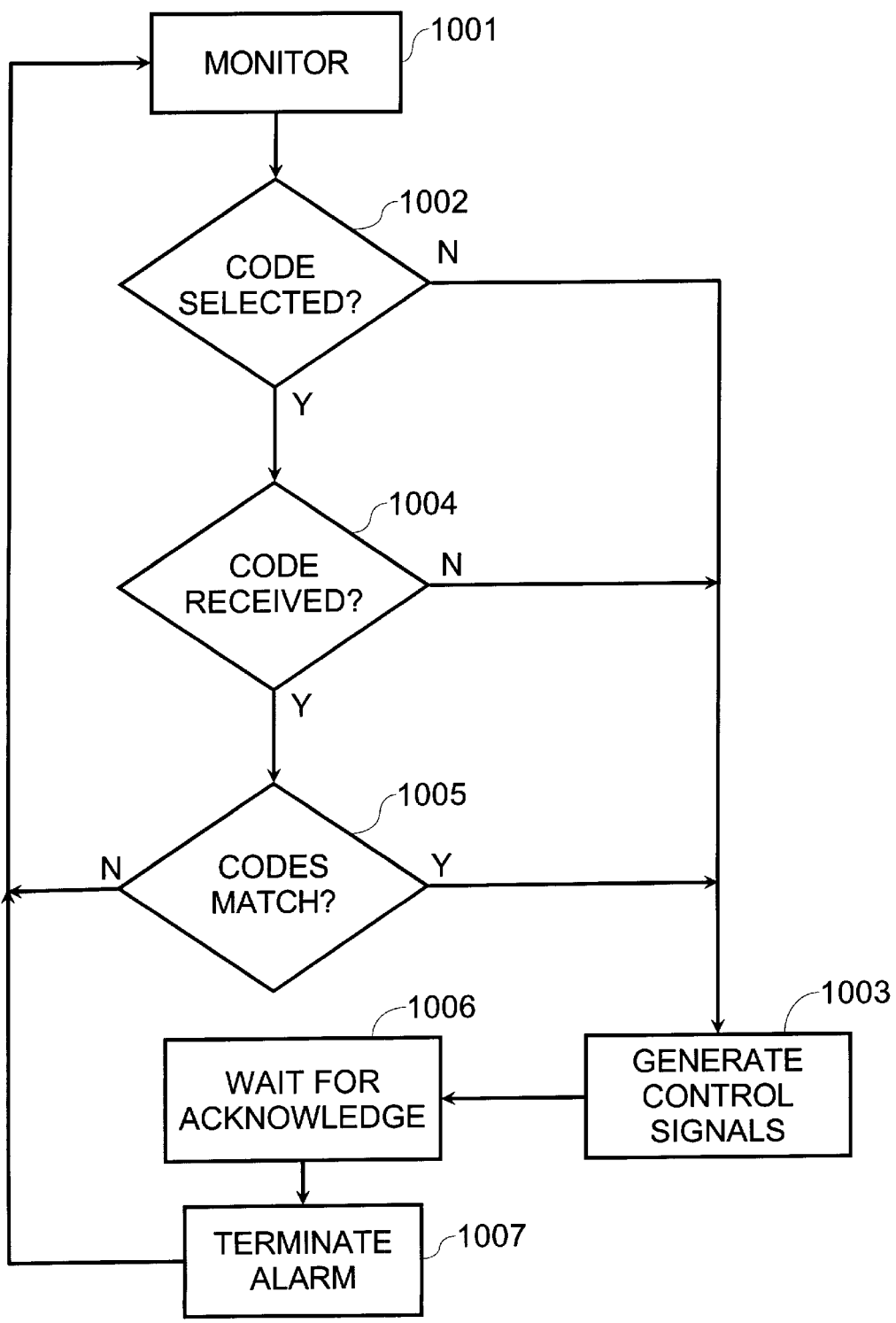
FIG. 3 is a logic diagram illustrating the operational steps of a microprocessor in accordance with the embodiment of FIG. 1.

FIG. 3 more clearly illustrates the operation of microprocessor 16. Initially, microprocessor 16 constantly monitors the output of signal detector 14 for a digital alert internal control signal at step 1001. Upon receipt of a digital alert internal control signal, microprocessor 16 will check to determine whether a location identifying code has been selected at step 1002. If a location identifying code has not been selected, then microprocessor 16 proceeds to step 1003. If a location identifying code has been selected, then microprocessor 16 next determines whether a SAME encoded location signal has been received at step 1004.

If a SAME encoded location signal has not been received, microprocessor 16 proceeds to step 1003. If a SAME encoded location signal has been received, then microprocessor 16 checks to determine if the SAME encoded location includes the selected location identifying code at step 1005. If the SAME encode location does not include the selected location identifying code, then microprocessor 16 returns to step 1001 and resumes monitoring the output of signal detector 14. If the SAME encoded location does include the selected location identifying code, then microprocessor 16 proceeds to step 1003.

At step 1003, microprocessor 16 generates internal control signals for output via microprocessor output lines 34, 36 and 38. Microprocessor output line 34 carries an alarm activation internal control signal for activation of an audible alarm 18 and a visual strobe alarm 20. Microprocessor output line 36 carries a controller activation internal control signal for activating a remote controller 22 to generate remote control signals for activating visual information source 26. Microprocessor output line 38 carries an internal control signal for activating an optional internal amplifier/speaker 44 for converting NOAA weather radio signals received by receiver 12 into audible signals to which the user may listen.

After step 1003, microprocessor 16 waits for the user to acknowledge the alert by pressing an acknowledge button 50 at step 1006. When the user acknowledges the alert, microprocessor 16 proceeds to step 1007 and terminates the alarm activation signal output via microprocessor output line 34 thereby terminating the activation of audible alarm 18 and visual strobe alarm 20. Microprocessor 16 then returns to step 1001 and resumes monitoring the output of signal detector 14.

Audible alarm 18 and visual strobe alarm 20 are each responsive to the alarm activation internal control signal generated by microprocessor 16 for alerting individuals in the vicinity of weather alert system 10 that a severe weather alert has been broadcast by the National Weather Service. Audible alarm 18 preferably includes a siren or speaker similar to that which would be found in a conventional smoke detector. Visual strobe alarm 20 is included to ensure that warning is provided to hearing impaired individuals. Preferably, visual strobe alarm 20 includes a xenon strobe flash lamp for producing bright flashes of light.

Figure 2:
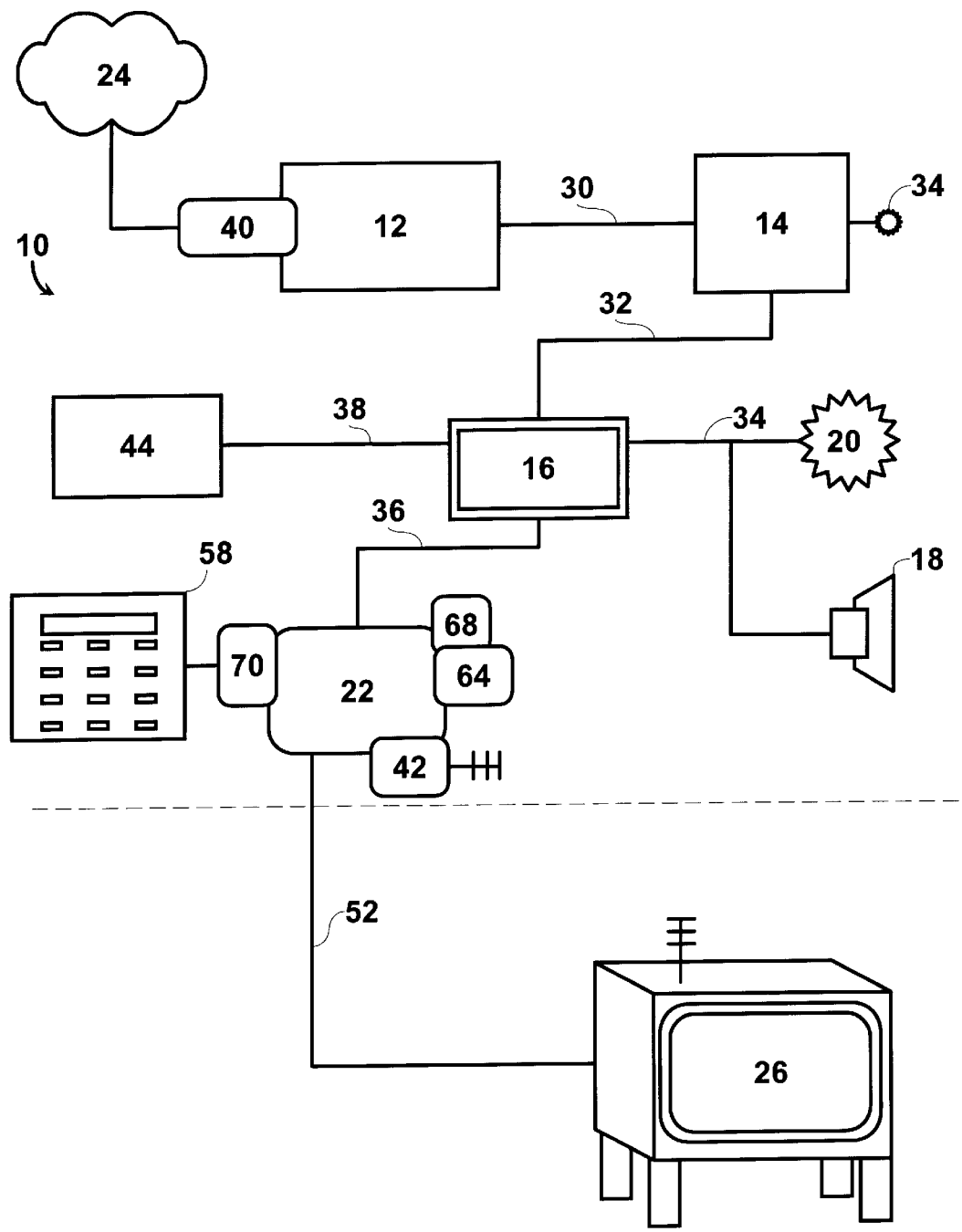
FIG. 2 is block diagram illustrating an alternative embodiment of the weather alert system in accordance with the present invention.

Remote controller 22 is operably connected to output 36 of microprocessor 16. In response to a controller activation internal control signal, remote controller 22 generates remote control signals for activating a visual information source 26 such as a television, LED information display, or computer monitor to a preselected informational channel or location. As shown in the exemplary embodiment of FIG. 1, remote controller 22 includes an infrared transmitter circuit 60 similar to that used in a conventional television remote control unit. In the exemplary embodiment, infrared transmitter circuit 60 is responsive to the controller activation internal control signal received from microprocessor 16 for generating external infrared control signals for subsequent receipt by a television 62 or analogous infrared responsive visual information source 26. Of course, it should be obvious that the infrared transmitter circuit 60 may also be replaced with a radio frequency transmitter 42 or a hardwired control connection 52 to the television 62 in alternative embodiments of the present invention as shown in FIG. 2.

In the exemplary embodiment, remote controller 22 is programmable to generate infrared control signals which can operate many different models of television 62 produced by different manufacturers. This may be accomplished in any manner which a conventional television universal remote control unit may be programmed. In the exemplary embodiment, infrared transmitter circuit 60 includes a programming sensor 64 for receiving infrared remote control signals from an external television remote control unit. To program remote controller 22, the user directs the beam of the external television remote control unit at programming sensor 64 and activates the remote controller as necessary to activate the television and to select the desired informational channel. Programming sensor 64 detects the remote control signals used and outputs a data signal representative of the control signals for storage in an internal memory storage unit 68. Upon receipt of a controller activation signal from microprocessor 16, infrared transmitter circuit 60 generates a series of remote control signals based upon the control signals stored in internal memory storage unit 68. In an alternative embodiment, as shown in FIG. 2, a user may input a number representative of particular a model of television via keypad 58 to select from a group of pre-recorded control signals maintained in a preprogrammed storage unit 70.

Figure 5:
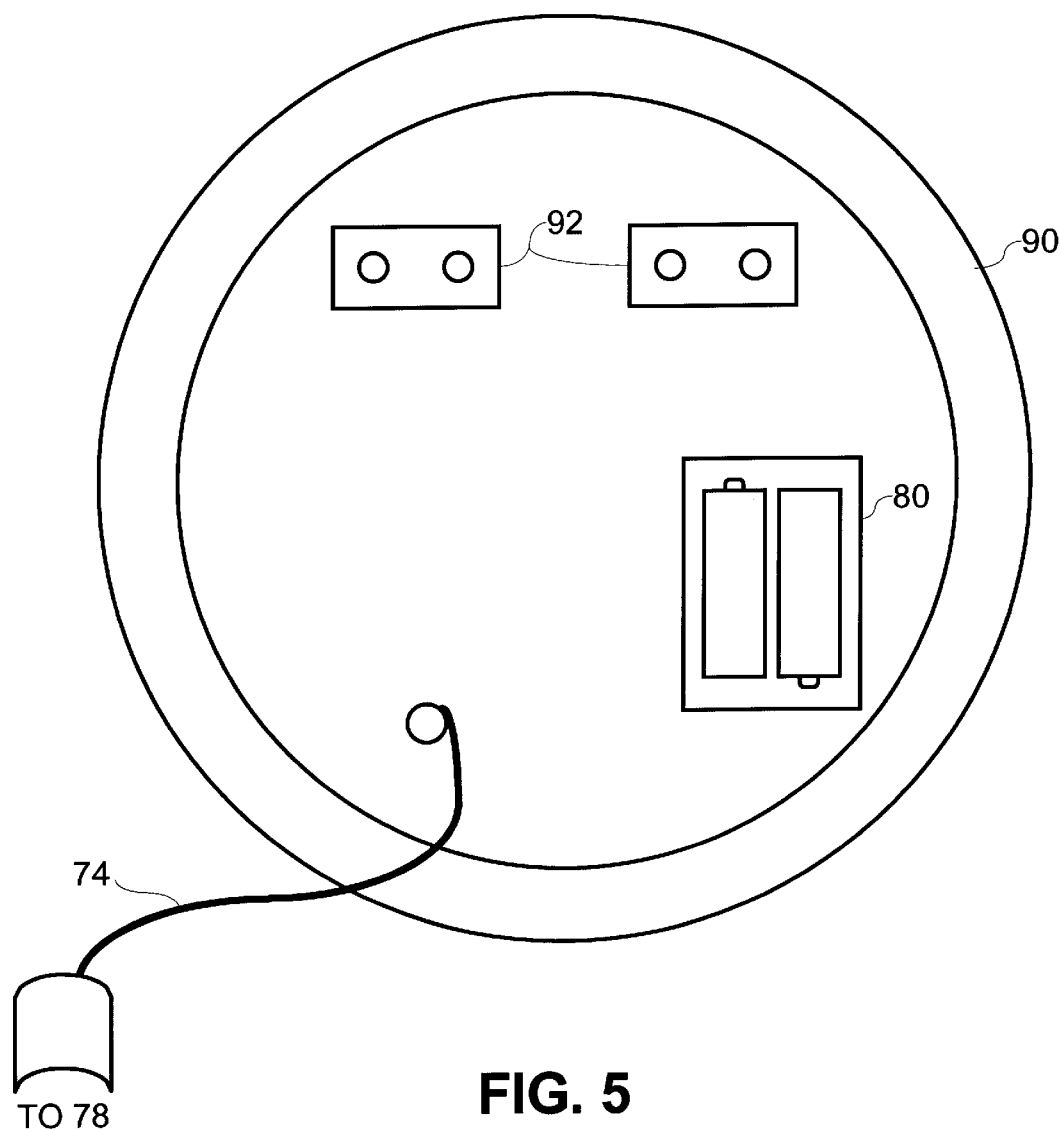
FIG. 5 is perspective view of an alternative embodiment of a weather alert system in accordance with the present invention.

As shown in FIG. 5, weather alert system 10 includes a connection 74 to a electrical distribution system 78 for providing power for operation of the system under normal operating conditions. Connection 74 may include either an external cord for connection to an electrical outlet or it may include a hardwired connection to the electrical distribution system 78. In the exemplary embodiment, weather alert system 10 also includes a battery 80 for providing backup power in the case of failure of electrical distribution system 78.

Figure 4:
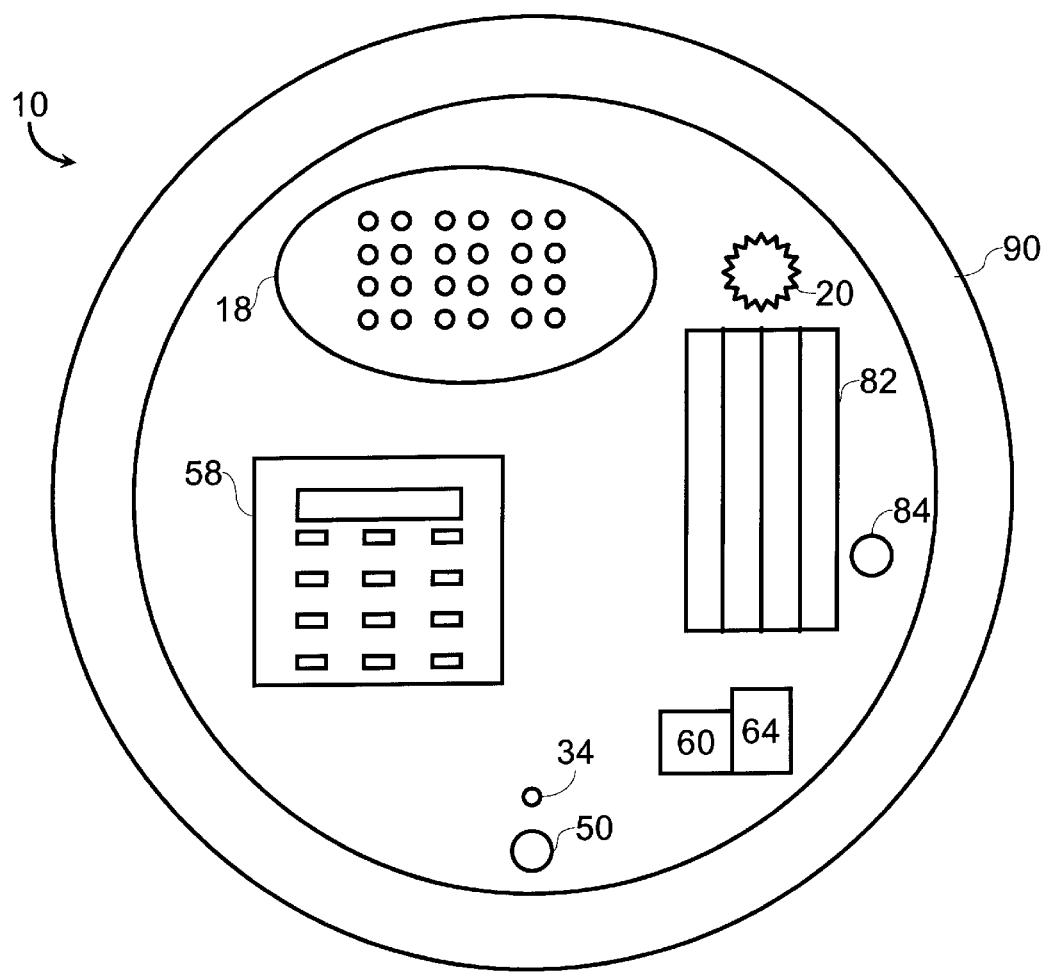
FIG. 4 is perspective view of a weather alert system in accordance with the embodiment of FIG. 1.

In the exemplary embodiment shown in FIG. 4, weather alert system 10 further includes a low wattage, battery-powered emergency light 82 which provides emergency lighting in the event of a failure of electrical distribution system 78. A switch may be included to allow the user to deactivate emergency light 82 to conserve battery power for monitoring National Weather Service or emergency broadcasts. A low battery LED may optionally be included to provide the user with an indication that battery power is approaching depletion.

As illustrated in FIGS. 4 and 5, in the exemplary embodiment, weather alert system 10 is preferably encased in a plastic enclosure 90 similar to that of a standard smoke detector, thereby making the weather alert system less accessible and reducing the likelihood of deactivation by the user. Plastic enclosure 90 includes mounting brackets 92 for attachment to a wall or ceiling and windows to allow emission of light from visual strobe alarm -, emergency light 82 and infrared transmitter circuit 60 and allowing access to programming sensor 64. Plastic enclosure 90 also includes holes whereby sound may freely pass from audible alarm 18 and through which status LED 34 may be viewed. Acknowledge button 50 is attached directly to plastic enclosure. In an alternative embodiment, weather alert system 10 may also be enclosed in a portable enclosure similar to that of a more conventional weather radio.

What have been described above are preferred embodiments of the present invention. It is, of course, not possible to describe every conceivable combination of methodologies for purposes of describing the present invention. However, one of ordinary skill in the art will recognize that many further combinations, permutations and modifications of the present invention are possible. Therefore, all such possible combinations, permutations and modifications are to be included within the scope of the invention, as defined by the following claims.

What is claimed is:

1. An alert system for activating a television in response to a signal indicative of an alert declaration by an authorized agency, said alert system comprising:

a signal detector for detecting said signal indicative of an alert declaration by an authorized agency and for generating an activation signal upon detection thereof;

a remote controller operatively connected to said signal detector for producing a remote control signal in response to said activation signal; and wherein said remote control signal includes a first signal for turning on said television and a second signal for causing the television to switch to a pre-selected informational channel.

2. The alert system of claim 1, wherein said signal detector includes a receiver for receiving said alarm signal.

3. The alert system of claim 2, wherein said receiver is a radio receiver for monitoring broadcast radio signals.

4. The alert system of claim 2, wherein said receiver is a hardwire signal receiver for receiving broadcast signals from a hardwired network.

5. The alert system of claim 1, wherein said signal detector includes a microprocessor for recognizing a portion of said alarm signal indicative of the location of said hazardous condition, said microprocessor comparing the location indicated by said portion of said alarm signal with a preprogrammed location, said microprocessor further directing said signal detector to generate said activation signal if said indicated location matches said preprogrammed location.

6. The alert system of claim 1, wherein said remote control signal is a wireless remote control signal.

7. The alert receiver of claim 1, further including an alarm operatively connected to said signal detector, said alarm being actuatable in response to said activation signal for alerting a user to the existence of the hazardous condition.

8. The alert system of claim 1, wherein said alert system further includes a housing for protecting said signal detector and said remote controller.

9. The alert system of claim 8, wherein said housing includes a fastening mechanism for attaching said housing to a wall.

10. The alert system of claim 1, wherein said remote control signal includes a signal for turning on said television.

11. The alert system of claim 1, wherein said remote control signal includes a signal for changing the channel to which said television is tuned to a preselected channel.

12. An alert system for activating a television to provide visual information relating to a hazardous condition in response to a signal indicative of an alert declaration by an authorized agency, said alert system comprising:

a radio receiver for receiving said signal indicative of an alert declaration by an authorized agency, said receiver outputting a signal representative of said signal indicative of an alert declaration by an authorized agency;

a signal detector for monitoring said representative signal for detecting said signal indicative of an alert declaration by an authorized agency and generating an activation signal upon detection thereof; and a remote controller operatively connected to said signal detector for producing a remote control signal in response to said activation signal, wherein said remote control signal includes a first signal for turning on said television and a second signal for causing the television to switch to a pre-selected informational channel.

13. The alert system of claim 12, wherein said signal detector includes a microprocessor for recognizing a portion of said alarm signal indicative of the location of said hazardous condition, said microprocessor comparing the location indicated by said portion of said alarm signal with a preprogrammed location, said microprocessor further directing said signal detector to generate said activation signal if said indicated location is in accordance with said preprogrammed location.

14. The alert receiver of claim 12, further including an alarm operatively connected to said signal detector, said alarm being actuatable in response to said activation signal for alerting a user to the existence of the hazardous condition.

15. The alert system of claim 12, wherein said alert system further includes a housing for protecting said radio receiver, said signal detector and said remote controller.

16. The alert system of claim 15, wherein said housing includes a fastening mechanism for attaching said housing to a wall.

17. A method for activating a television to provide information relating to a hazardous condition in response to a signal indicative of an alert declaration by an authorized agency, said method comprising the steps of:

detecting an alarm signal signal indicative of an alert declaration by an authorized agency; and generating a remote control signal in response to said alarm signal, wherein said remote control signal includes a first signal for turning on said television and a second signal for causing the television to switch to a pre-selected informational channel.

18. The method for activating a television to provide information relating to a hazardous condition of claim 17, wherein said alarm signal detecting step further includes the step of receiving said alarm signal on a radio receiver.

19. The method for activating a television to provide information relating to a hazardous condition of claim 17, further including the step of activating an audible alarm.

20. The method for activating a television to provide information relating to a hazardous condition of claim 17, wherein said signal detecting step includes the steps of:

recognizing a portion of said alarm signal indicative of the location of said hazardous condition;

comparing the location indicated by said portion of said alarm signal with a preprogrammed location; and generating said remote control signal if said indicated location is in accordance with said preprogrammed location.

* * * * *